United States Patent
Metzger et al.

(10) Patent No.: US 8,670,537 B2
(45) Date of Patent: Mar. 11, 2014

(54) ADJUSTING AUDIO VOLUME IN A CONFERENCE CALL ENVIRONMENT

(75) Inventors: Larry Raymond Metzger, Wake Forest, NC (US); Michael P. O'Brien, Manasquan, NJ (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1725 days.

(21) Appl. No.: 11/461,386

(22) Filed: Jul. 31, 2006

(65) Prior Publication Data

US 2008/0037749 A1 Feb. 14, 2008

(51) Int. Cl.
*H04M 3/42* (2006.01)

(52) U.S. Cl.
USPC ............ 379/202.01; 379/204.01; 379/206.01; 370/260

(58) Field of Classification Search
USPC ............. 379/202.01, 205.01, 206.01, 210.01, 379/204.01; 370/260, 261, 266, 268, 269; 455/416

See application file for complete search history.

(56) References Cited

U.S. PATENT DOCUMENTS

| | | | | |
|---|---|---|---|---|
| 5,467,139 A * | 11/1995 | Lankford | ...................... | 348/512 |
| 5,539,741 A * | 7/1996 | Barraclough et al. | ......... | 370/267 |
| 5,751,904 A * | 5/1998 | Inazumi | ...................... | 704/232 |
| 6,457,043 B1 | 9/2002 | Kwak et al. | | |
| 7,221,290 B2 * | 5/2007 | Burgemeister | ................ | 340/945 |
| 2003/0112947 A1 * | 6/2003 | Cohen | ...................... | 379/202.01 |
| 2005/0152524 A1 * | 7/2005 | Carlson et al. | ........... | 379/202.01 |

* cited by examiner

*Primary Examiner* — Oleg Asanbayev
(74) *Attorney, Agent, or Firm* — Schwegman Lundberg & Woessner, P.A.

(57) ABSTRACT

A method of and system for adjusting audio volume in a conference call environment are disclosed. The method comprises associating respective gain factors with each source of a plurality of incoming audio streams. The method further comprises automatically adjusting the volume of each incoming audio stream in accordance with the associated gain factor. In accordance with example embodiments, the method may be performed either at a telephony endpoint such as a VoIP telephone or at a conference bridge.

11 Claims, 6 Drawing Sheets

FIG 4

ADJUSTING AUDIO VOLUME IN A CONFERENCE CALL ENVIRONMENT

FIELD

This application relates to telecommunications and telephony, and particularly to a method, device and system for adjusting audio volume in a conference call environment.

BACKGROUND

A conference call is a telephone call (audio and/or video) between more than two callers or users. Thus, a user is able to speak to, and listen to, two or more other users simultaneously. A problem arises when some of the users speak softly while others have louder voices, such that some voices will be louder or softer than others. This could also be caused by differing equipment, for example if some participants in a conference call use inferior endpoint devices. In such case, listeners find themselves continually adjusting the volume of their endpoint device to normalize the volume of the respective speakers' voices.

A conference call with a plurality of participants can be conducted via multicast, or using a conference bridge or centralized server which connects numerous endpoints using appropriate unicast signaling (e.g. SIP). Mixing of the various incoming voice streams can be done at endpoint devices or at a centralized server.

BRIEF DESCRIPTION OF DRAWINGS

The present invention is illustrated by way of example and not limitation in the figures of the accompanying drawings, in which like references indicate similar elements and in which.

DETAILED DESCRIPTION OF THE DRAWINGS

In the following description, for purposes of explanation, numerous specific details are set forth in order to provide a thorough understanding of an embodiment of the present invention. It will be evident, however, to one skilled in the art that the present invention may be practiced without these specific details.

Figure 1:
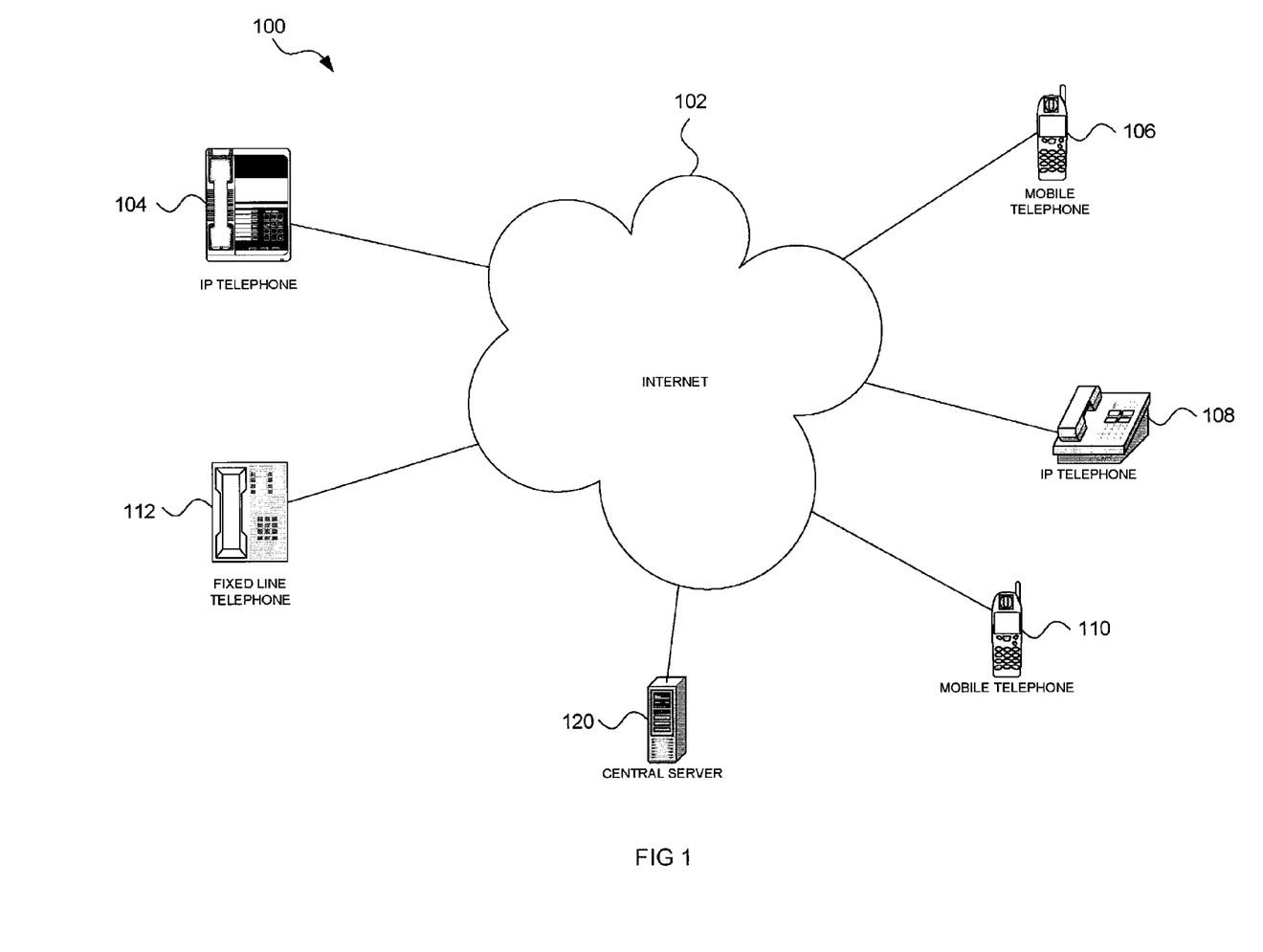
FIG. 1 shows a schematic representation of a system, in accordance with an example embodiment, to adjust audio volume during a conference call.

FIG. 1 shows a system 100, in accordance with an example embodiment, to adjust audio volume in a conference call environment (e.g., during a conference call). The system 100 includes a telecommunications network, in this example the Internet 102. The system 100 further includes a plurality of telephony endpoint devices. The term "telephony endpoint device" includes any device having telephonic capabilities, e.g. a telephone, a PDA, a computer with a CTI (Computer Telephony Interface), and the like (with or without video capabilities). The telephony endpoint devices are shown by way of example to be in the form of telephones 104 to 112 which are operable in a conference call environment and may thus, for example, be mobile telephones, fixed line telephones, IP telephones (e.g. VoIP telephones), and the like. The telephones 104 to 112 may use multicast protocol for communicating with one another. In an example embodiment, the telephones 104 to 112 may use unicast protocol via a meshed connection, each telephone 104 to 112 therefore having multiple unicast connections (one per participant). In yet another example embodiment, the telephones 104 to 112 may use a multicast protocol. The telephones 104 to 112 may all belong to the same virtual talk group (VTG), or other conference call channel.

In an example embodiment the system 100 may include a conference bridge, in the example form of a central server 120. The term "central" need not imply that the central server 120 is located equidistantly between the telephones 104 to 112, but merely that the central server 120 is operable to receive a voice stream from each of the telephones and forward the voice stream to the other telephones. In such a case, communications from the telephones 104 to 112 are routed via the central server 120 to each of the other telephones. Each time a new telephone is selected (to select a new participant) the central server 120 may notify the other endpoint devices or telephones 106 to 112 of the source of the incoming voice stream. The central server 120 may be configured to adjust the gain factor for each of the respective telephones 106 to 112. As described in more detail below, in an example embodiment the central server may allow each participant in a telephone conference to adjust the volume of each other participant that he or she hears. Thus, different participants may set different volume levels for the voice streams that they hear.

Figure 2A:
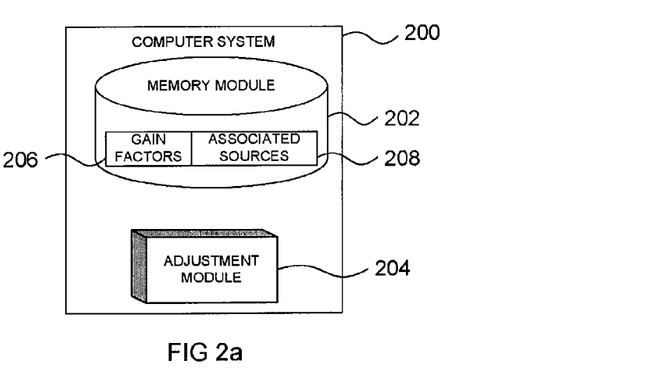
FIG. 2a shows a high-level schematic representation of a computer system in accordance with an example embodiment.

FIG. 2a shows a high-level representation of a computer system 200, in accordance with an example embodiment, to adjust audio volume during a conference call. The computer system 200 (or any of its functionality) may be embodied by, and form part of, one or more of the telephones 104 to 112 and/or by the central server 120. The computer system 200 is shown to include a memory module 202 and an adjustment module 204. The memory module 202 has stored thereon a plurality of gain factors 206 and associated sources 208 to which the respective gain factors 206 are to be applied. The source 208 may be in the form of an IP address to identify uniquely a telephone or endpoint from which an audio stream originates. It is however to be noted that any other techniques may be used to identify a sources (e.g., Automatic Number Identifiers (ANI)), speaker recognition (or voiceprint), etc.

The adjustment module 204 may be a conceptual module which corresponds to a functional task performed by the computer system 200. In particular, the adjustment module 204 may be operable to adjust (e.g. amplify, attenuate, mute, etc) an incoming audio stream in accordance with a gain factor 206 associated with a source 208 of the incoming audio stream (e.g., provided in packets or datagrams). The term "gain factor" may refer generally to a factor or coefficient by which audio volume is to be adjusted.

Figure 2B:
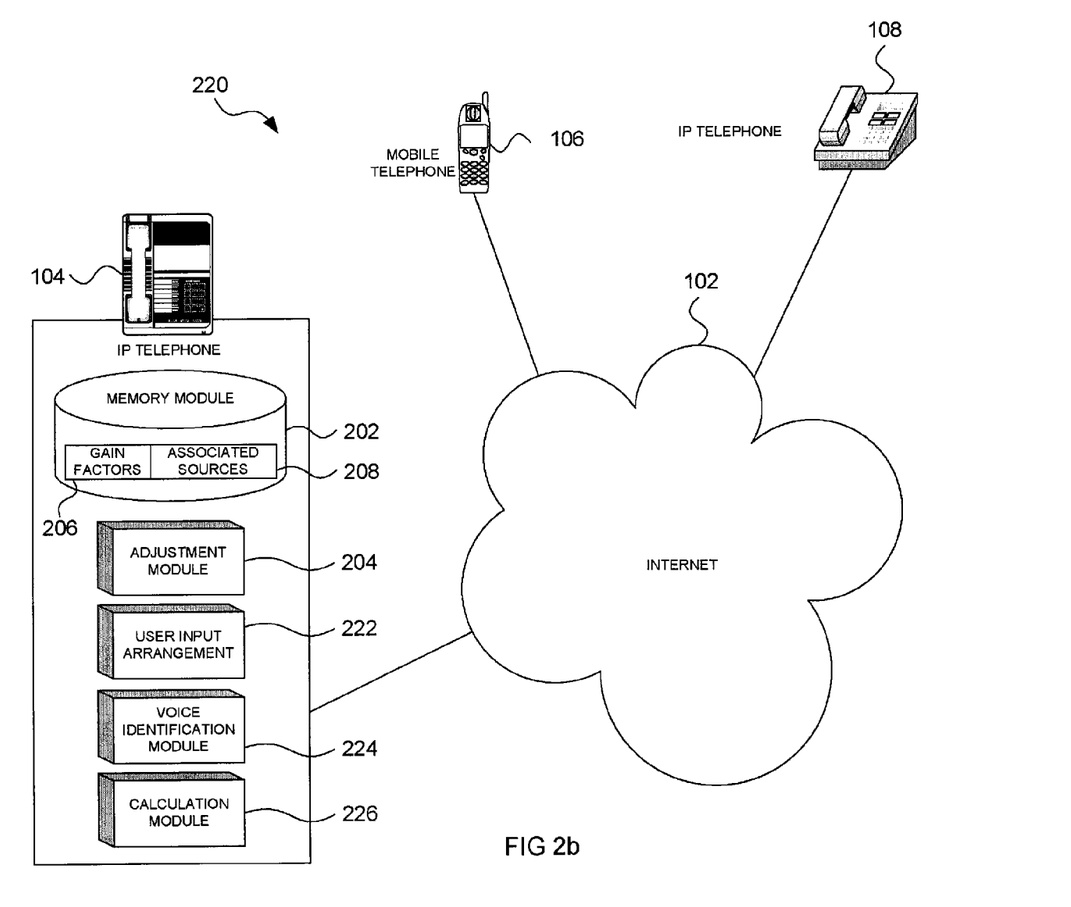
FIG. 2b shows a low-level schematic representation of a system, in accordance with an example embodiment, to adjust audio volume during a conference call.

FIG. 2b shows a telephony system 220 in accordance with an example embodiment, the system 220 corresponding largely to the system 100 of FIG. 1, but being shown in greater detail. The system 220 includes a plurality of endpoint devices or telephones 104 to 108 (only three of which are shown for ease of explanation). The telephone 104 is shown to incorporate a computer system such as the system 200 of FIG. 2a, and therefore has a memory module 202 and an adjustment module 204. The telephone 104 further includes: a user input arrangement 222 to receive a user input; a voice identification module 224 to identify or recognize different voices in a single incoming audio stream; and a calculation module 226 automatically to calculate a gain factor, if desired. The other telephones 106 and 108 of the system 220 may be conventional conference call telephones, and may be similarly configured for automatic gain control switching.

The telephone 104 may have stored on its memory module 202 a plurality of gain factors 206, each of which is associated with a respective incoming audio stream sourced from the telephones 106 and 108. Thus, a separate gain factor (volume adjustment) may be applied to each incoming audio stream. The gain factors may be entered or adjusted via the user input arrangement 222 which may include existing volume control buttons on the telephone 104. These buttons may be hard buttons, e.g. physical volume buttons on the telephone 104, or virtual/soft buttons assigned to the telephone 104 (e.g., on a touch sensitive screen). Entering or adjusting a gain factor may include increasing or decreasing the reproduction volume of an incoming audio stream. Once a particular gain factor has been defined for a particular audio stream it may be stored and applied to the associated audio stream each time the audio stream is received during a conference call. In an example embodiment, a user of the telephone 104 may manually select which incoming audio stream is associated with an entered gain factor. For example, a list of conference call participants may be provided and the user may adjust the volume of each participant individually that the user hears. It should be noted that the term gain is intended to include any technique or method for adjusting a volume of audio (speech) rendered to a user.

It is to be understood that in a VoIP network environment, the audio streams are sent using IP packets. The source of a particular incoming audio stream (packets) may thus be identified by reading a header of incoming IP packets. The packets may be SYN packets, RTP RTCP packets, or the like.

For ease of description, the gain factor (volume adjustment) is further described as a number which ranges from 0 to 10, with 10 being maximum gain (volume) and with zero being minimum gain (e.g. mute). For example, the user may, via the user input arrangement 222, manually specify that an audio stream coming from a particular telephone, e.g. the telephone 106, is associated with a gain factor by entering the gain factor and entering the source of the audio stream with which the gain factor is to be associated. Instead, or in addition, when a user enters a gain factor, the user input arrangement 222 may automatically associate that gain factor with the source of an audio stream which is currently received. For example, if the telephone 104 is busy receiving an audio stream from the telephone 108 and the user input arrangement 222 receives a gain factor (e.g. of 4) from the user, that gain factor may be automatically associated with audio stream coming from the telephone 108. It should also be noted that the gain factor or value of the increase/decrease need not be displayed to a user. Thus, the user may adjust the volume of the audio rendered without being aware of any absolute values. For example, up and down buttons on a telephone device may be used to adjust the volume of a particular audio stream in a telephone conference as opposed to adjusting the volume of all audio streams received by the device. Thus a more granular control of individual voice streams may be performed.

It may happen that two people are using a common telephone, for example, two participants may be speaking into the telephone 108. The voice identification module 224, using known voice identification techniques, may then recognize or differentiate the voices of the two participants, so that a separate gain factor (volume adjustment) can be associated with each participant even though the audio stream of each speaker originates at the same source device 108.

Instead of, or in addition to, a user manually entering a gain factor, the calculation module 226 may be operable to calculate a gain factor which, when applied to an incoming audio stream, would normalize the volume of that incoming audio stream. The calculated gain factor would then automatically be associated with the source of that incoming stream. Thus, the calculation module 226 may automatically adjust the gain or volume of an individual stream at the endpoint. Adjusting the gain at receiving endpoint is in contrast to Automatic Gain Control (AGC) which adjusts or regulates the volume of the call once all the participants' voice streams have been mixed together.

Figure 2C:
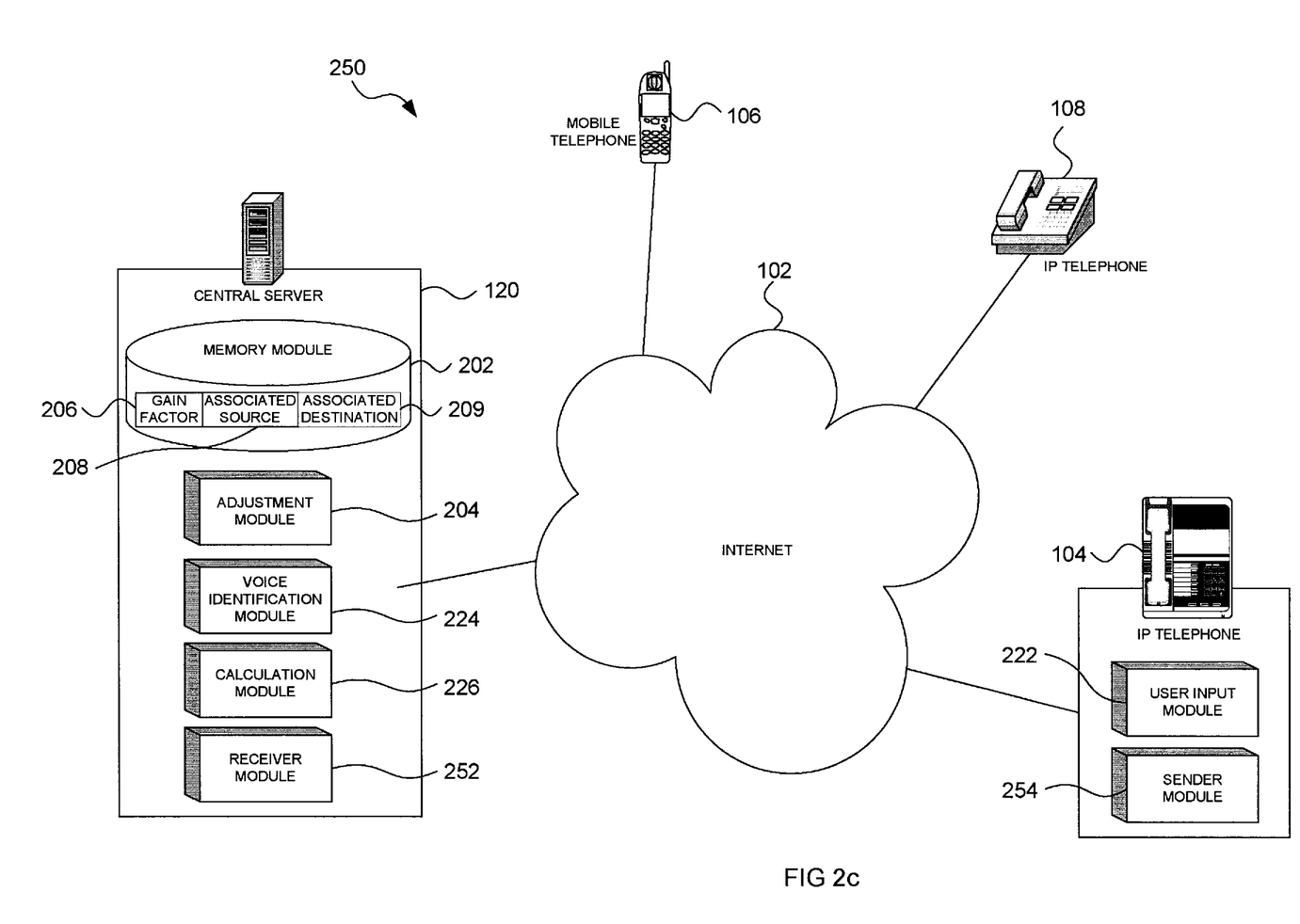
FIG. 2c shows a further low-level schematic representation of a system, in accordance with another example embodiment, to adjust audio volume during a conference call.

Referring now to FIG. 2c, a system 250, in accordance with another example embodiment, to adjust audio volume during a conference call is shown. In contrast with the system 220 of FIG. 2b, the system 250 includes a conference bridge in the form of a central server 120. Therefore, instead of the telephones 104 to 108 transmitting audio streams directly to one another, the telephones 104 to 108 transmit audio streams to the central server 120, which therefore acts as an intermediary. The various incoming audio streams may then be mixed by the central server 120 and routed or forwarded back to the telephones 104 to 108. In such a case, it is to be appreciated that the adjustment of the audio volume may occur not at the telephones 104 to 108, but rather at the central server 120. Therefore, the memory module 206, the adjustment module 204, the voice identification module 224 and the calculation module 226 shown by way of example in FIG. 2a may be provided by the central server 120.

However, if the central server 120 is operable to provide a source identification with the audio streams it forwards to the telephones 104 to 108 (e.g. in accordance with U.S. Pat. No. 6,457,034, the entire contents of which is herein incorporated by reference), the volume adjustment may still occur at the telephones 104 to 108 themselves, even though central server 120 is being used.

That being said, if volume adjustment is done by the central server 120, it may further include a receiver module 252, while at least one telephone 104 may likewise include a sender module 254, to permit transmission of a user assigned gain factor relating to audio stream sources from the telephone 104 to the central server 120. Any gain factor received via the user input arrangement 222 may in such case be sent from the telephone 104 to the central server 120, so that an audio stream coming from the source associated with the gain factor can be adjusted by the central server 120. In such a case, the gain factor is not only associated with a source to which the gain factor is to be applied, but it is also associated with an endpoint or destination (e.g. the telephone 104) to which the audio stream is to be transmitted. Thus, the memory module 202 of the central server 120 may also have stored thereon a destination associated 209 with each stored gain factor.

Further, according to an aspect of the example embodiment, the calculation module 226 may be operable to mute (e.g. apply a gain factor of 0) to any audio stream which is so loud that playing that audio stream would effectively amount to a denial of services. Therefore, the calculation module 226 may be operable to restrict any denial of service audio streams. Thus, in an example embodiment, each user may mute one or more speakers in a conference call so that audio of the one or more speakers is muted for that user only and not muted for all other participants in the conference call.

In an example embodiment, a user of a telephone may listen to only one source during a conference call. For example, if the user of the telephone 104 is interested only in what the speaker of the telephone 106 has to say, and wishes to completely ignore any other speakers, the user of telephone 104 may mute all other incoming audio streams, for example by adjusting the gain factors associated with all other telephones (e.g. the telephone 108) to 0. The user of the telephone 104 will thus only hear the audio stream from the telephone 106, which is only what he or she is interested in.

Figures 3A, 3B:
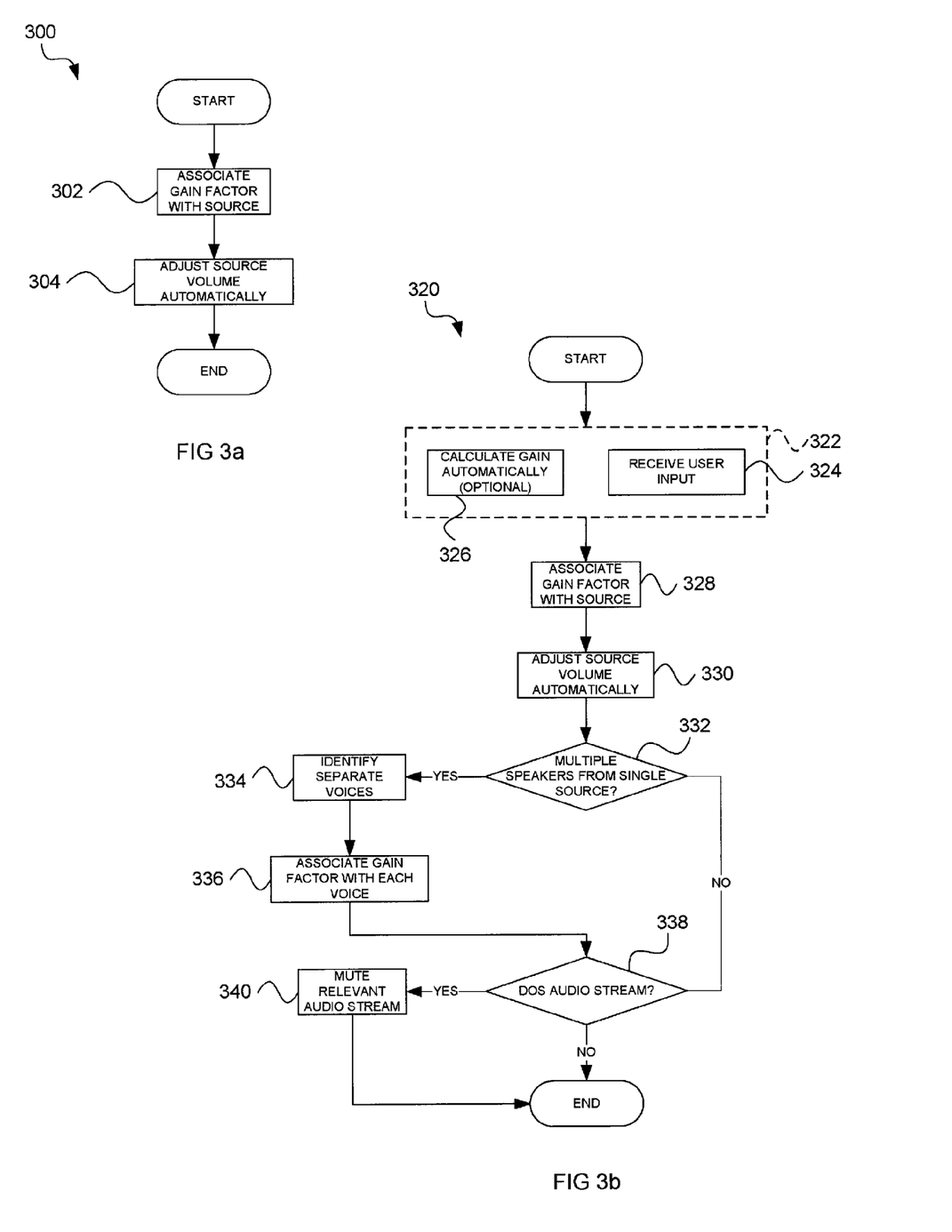
FIG. 3a shows a high-level flow diagram of a method, in accordance with an example embodiment, for adjusting audio volume during a conference call.
FIGS. 3b and 3c show low-level flow diagrams of further methods, in accordance with example embodiments, for adjusting audio volume during a conference call.
Figure 3C:
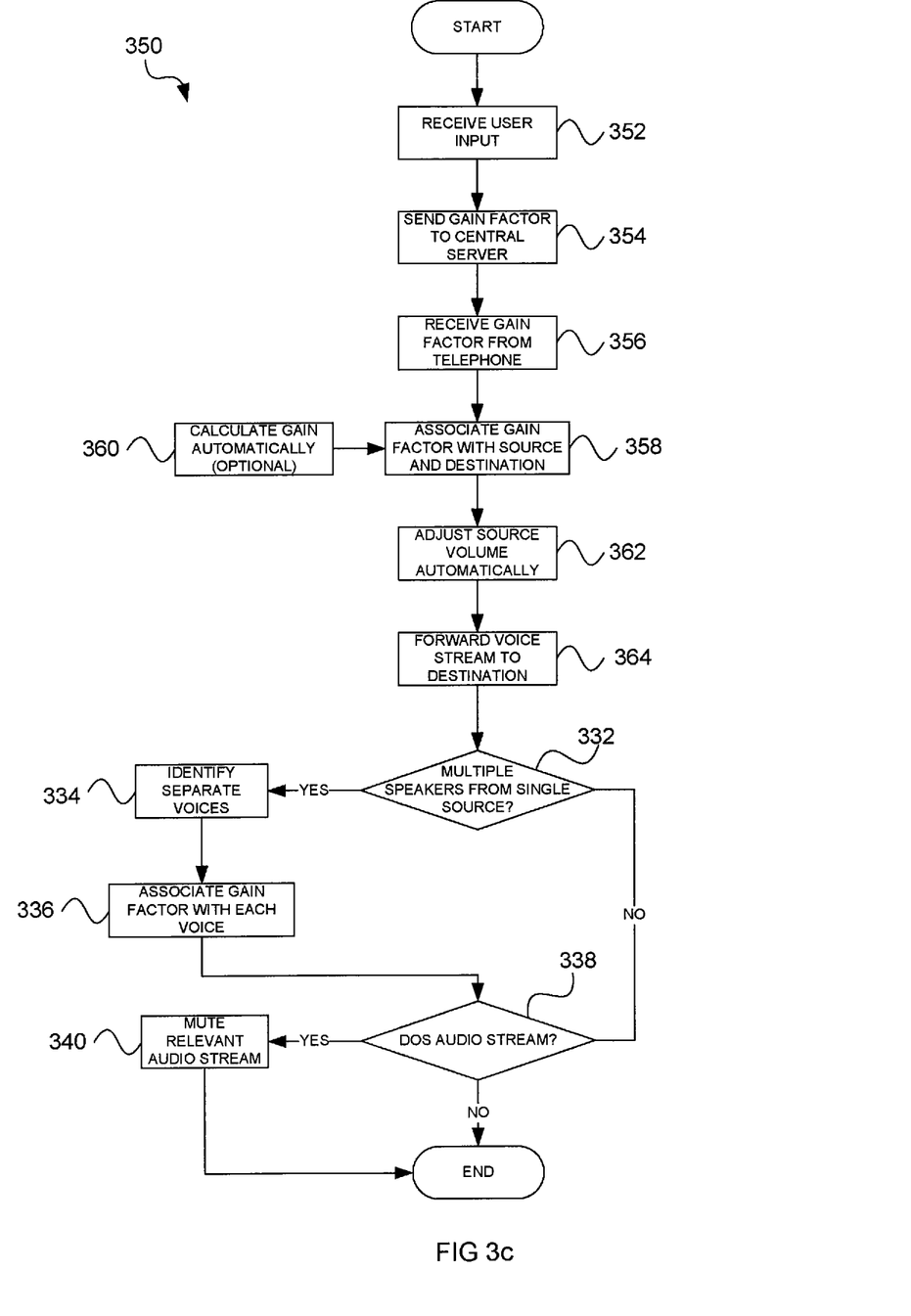

Example embodiments are further described in use with reference to FIGS. 3a, 3b, and 3c. FIG. 3a shows a high-level flow diagram of a method 300, in accordance with an example embodiment, for adjusting audio volume during a conference call. As shown at block 302, a gain factor is associated, with a particular source of an audio stream. It is to be understood that this step may be repeated for each audio stream source, thereby to associate each audio stream source with an independent gain factor (volume adjustment factor). Next, a volume of an audio stream from a particular source is adjusted, at block 304, by the gain factor associated with the source of the incoming audio stream. Thus, the volume of each incoming audio stream is adjusted independently of other audio streams in accordance with the gain factor associated with the source of that audio stream.

FIG. 3b shows a flowchart which describes a method 320 in accordance with an example embodiment in more detail. The flowchart 320 may be particularly applicable to a system which does not include a conference bridge or a central server, e.g. the system 220 of FIG. 2b, or to a system which does include a conference bridge, e.g. the central server 120, which is operable to transmit a source ID with every audio stream.

As shown at block 322, a gain factor may be determined. The gain factor may be determined by a receiving, at block 324, a user input via the user input arrangement 222. Instead, or in addition, the gain factor may be calculated automatically by the calculation module 226 based on a normalized volume, depending on the configuration of the telephone 104.

For example, and referring now additionally to FIG. 2b, a conference call, e.g. in the form of a virtual talk group, may be initiated between endpoints or the telephones 104 to 108. Audio streams, specifically voice streams, come from the telephones 106 and 108 directly to the telephone 104. Whether unicast or multicast protocol is used, the telephone 104 is operable to determine a source device from which each voice stream originates, e.g. by analyzing a packet header of the voice stream. In this example, the participant speaking on the telephone 106 is assumed to speak in a soft or muted voice, while the participant of the telephone 108 is assumed to speak with a loud booming voice. Thus, while the user of the telephone 104 is listening to a voice stream sourced from the mobile telephone 106, the user increases (at block 324) the volume via the user input arrangement 222. The increased volume translates into a higher gain factor, e.g. a gain factor of 8. Because a voice stream with the telephone 106 as the source was being received as the gain factor was entered, the gain factor is automatically associated (at block 328) with incoming voice streams sourced from the telephone 106. Similarly, the user decreases the volume as he listens to the louder voice stream from the telephone 108. A lower gain factor, e.g. a gain factor of 3, is thus associated with voice streams sourced from the telephone 108.

Each subsequent voice stream from the telephone 106 or 108 is adjusted (at block 330) in accordance with the gain factor associated with that telephone. For instance, when the telephone 104 receives a voice stream from the telephone 106, the voice stream is automatically amplified as it is associated with a high gain factor. Similarly, the voice stream from the telephone 108 is automatically attenuated, thereby providing the user of the telephone 104 with a more or less constant or normalized conversation volume.

An additional feature of an example embodiment is provided by the voice identification module 224. If two speakers are using, at block 332, the same telephone, e.g. the telephone 108, the voice stream coming from telephone 108 may include two separate voices. The voice identification module 224 may then be operable to recognize or identify, at block 334, the separate voices which constitute the voice stream. Thus, each voice constitutes a source, or sub-source, with which a gain factor may be associated, at block 336. Therefore, the adjustment module 204 adjusts each voice of the incoming voice stream in accordance with the particular gain factor associated with that voice (see also block 330). Thus, in an example embodiment, more than one gain factor may be associated with a single telephony endpoint.

The calculation module 226, in addition to being operable to calculate automatically a gain factor to normalize the volume of incoming stream, is also operable to prevent a denial of services attack on the conference callers. If an incoming audio stream is so loud that it overrides all other incoming audio streams, the services of the conference call have effectively been denied. The calculation module 226 is operable to detect, at block 338, such an incoming voice stream, and mute, at block 340, that incoming stream. For example a gain factor of 0 may be associated with that stream such that all other incoming streams may then be heard again.

Referring now to flow diagram of FIG. 3c, a method 350 in accordance with an example embodiment is shown when volume adjustment is done at a conference bridge, e.g. a central server 120. Reference is thus also made to FIG. 2c. The telephone 104 receives, at block 352, a user input from the user input arrangement 222 to specify a gain factor. The sender module 254 sends, at block 354, the gain factor to the central server 120, which is received, at block 356, by the receiver module 252. The gain factor is associated, at block 358, with a source, e.g. the telephone 106, of an audio stream which was being transmitted to telephone 104 when the gain factor was received. In this example embodiment, the gain factor is further associated with a destination—the telephone 104—to which the adjusted audio stream is to be transmitted. Instead, or in addition, the gain factor may be calculated automatically, at block 360.

When the central server 120 receives a voice stream having a source, e.g. the telephone 106, and a destination, e.g. the telephone 104, the voice stream is adjusted, at block 362, in accordance with the associated gain factor, and is forwarded, at block 364, onward to its destination.

The method 350 may further include steps 332 to 340 which are similar to the steps of the method 320 having the same references.

Figure 4:
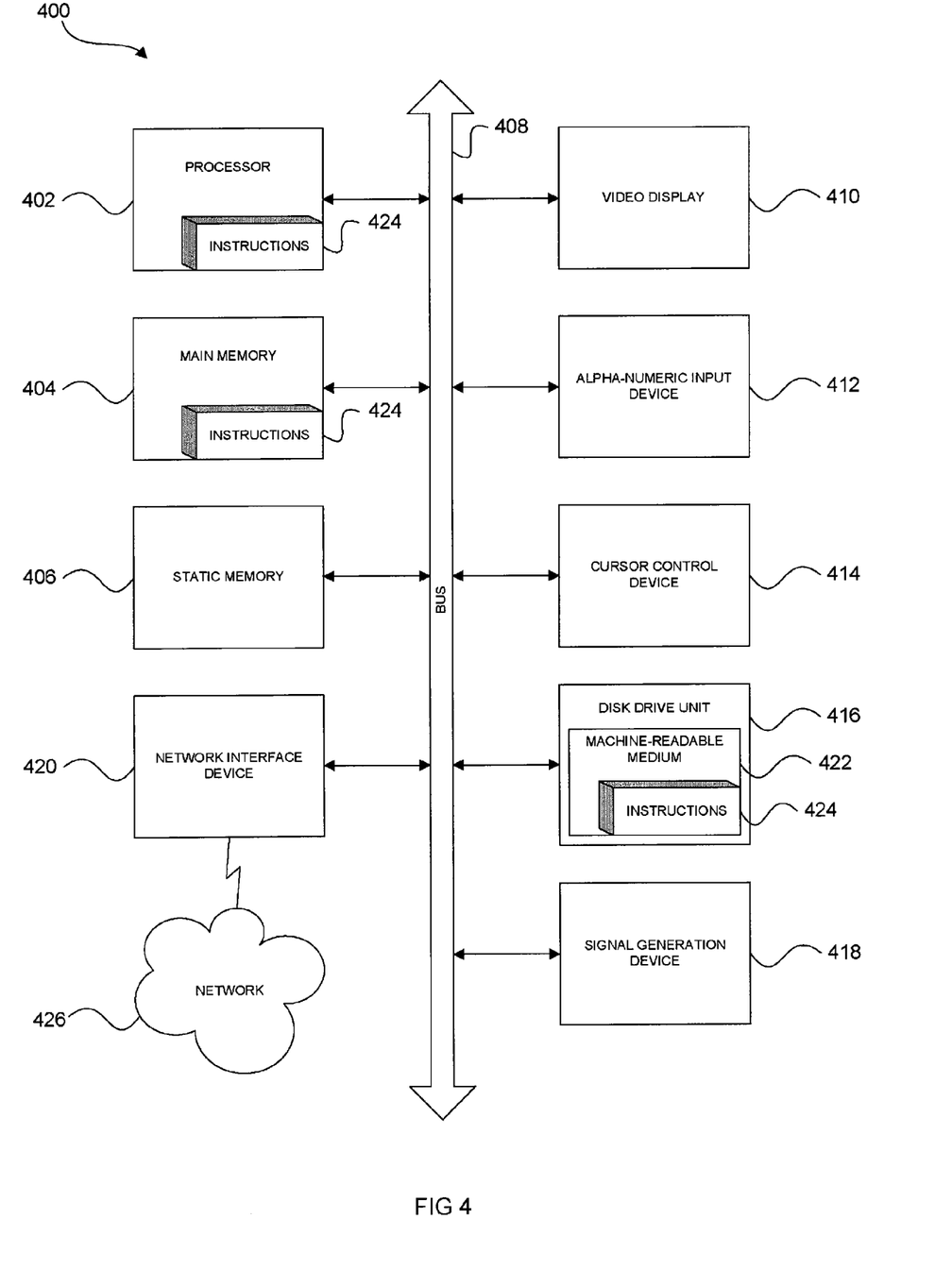
FIG. 4 shows a schematic representation of machine in the example form of a computer system within which a set of instructions, for causing the machine to perform any one or more of the methodologies discussed herein, may be executed.

FIG. 4 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked)

to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Anyone of telephones 104 to 112 and/or central server 120 may be in the form of computer system 400.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The example embodiments as exemplified have the advantage that a gain factor is associated with each incoming voice source, and therefore with each speaker. This gain factor may be entered manually by a user or may be calculated automatically. Thus, the user may adjust the volume of each other speaker independently such that the overall volume of the conference call is exactly in line with preferences of the user. Further, denial of services may be prevented by muting an incoming voice stream which is so loud as to overpower other voice streams. In addition, the user may focus on only one (or more) speakers to which he wants to listen, therefore eliminating or muting any other speakers in which he is not interested.

What is claimed is:

1. A method for adjusting audio volume during a telephony conference call, the method comprising:

receiving, at a telephony endpoint, a plurality of incoming voice streams from a plurality of associated source devices;

identifying from the plurality of incoming voice streams at least one multi-participant voice stream, each multi-participant voice stream originating from a multi-participant source device that forms part of the plurality of associated source devices and that is configured for use in the telephony conference call by two or more different conference call participants, the each multi-participant voice stream comprising two or more separate voices of respective the two or more different conference call participants;

identifying, at the telephony endpoint, a particular multi-participant source device from which a particular multi-participant voice stream originated, by analyzing headers of IP packets carrying the plurality of incoming voice streams;

identifying the two or more separate voices of the two or more different conference call participants, and associating separate gain factors to each voice in the at least one multi-participant voice stream, the identifying of the two or more separate voices being performed by a voice recognizer at the telephony endpoint and being based on respective voiceprints for the two or more separate voices;

receiving, via a user input arrangement at the telephony endpoint, a user input that indicates audio volume adjustment of the telephony endpoint without the user specifying to which one of the two or more different conference call participants of the particular multi-participant voice stream the user input pertains;

automatically identifying, at the telephony endpoint, that the user input is received at the same time as a particular voice belonging to a particular conference call participant of the particular multi-participant voice stream;

identifying a particular gain factor based on the user input received at the same time as the particular voice belonging to the particular conference call participant of the particular multi-participant voice stream, and associating the particular voice belonging to the particular conference call participant with the particular gain factor;

automatically adjusting, at the telephony endpoint and based on the particular gain factor, audio volume of the particular voice independently of audio volume of one or more other voice streams in the plurality of incoming voice streams;

calculating at least one gain factor associated with one or more further incoming voice streams distinct from the particular multi-participant voice stream, the calculating of the at least one gain factor being based, at least partially, on a corresponding user input for each of the one or more further incoming voice streams;

automatically adjusting audio volume of the one or more further incoming voice streams based on the calculated at least one gain factor;

preventing a denial of service attack on the telephony conference call by identifying from the plurality of incoming voice streams a denial of service attack stream whose volume level exceeds a threshold corresponding to a magnitude effective to override the plurality of incoming voice streams, excluding the denial of service attack stream, of the telephony conference call; and in response to identifying the denial of service attack stream, automatically assigning a gain factor of zero for the identified denial of service attack stream.

2. The method as claimed in claim 1, which comprises automatically adjusting audio volume of each of the plurality of incoming voice streams based on a respectively corresponding gain factor, the audio volume of each of the plurality of incoming voice streams being adjusted independently of audio volume of any other one of the plurality of incoming voice streams.

3. The method as claimed in claim 1, further comprising automatically adjusting the audio volume of one or more of the plurality of incoming voice streams at a conference bridge.

4. The method as claimed in claim 3, which comprises transmitting one or more gain factors from the telephony endpoint to the conference bridge, each of the one or more gain factors being associated with both a corresponding one of the plurality of source devices and the telephony endpoint from which the one or more gain factors are transmitted.

5. A non-transitory tangible computer readable storage medium embodying instructions which, when executed by a machine, cause the machine to:

receive, at a telephony endpoint, a plurality of incoming voice streams taking part in a telephony conference call, the plurality of incoming voice streams having a respective audio volume and being received from a plurality of associated source devices;

identify from the plurality of incoming voice streams at least one multi-participant voice stream, each multi-participant voice stream originating from a multi-participant source device that forms part of the plurality of associated source devices and that is configured for use in the telephony conference call by two or more different conference call participants, the each multi-participant voice stream comprising two or more separate voices of respective the two or more different conference call participants;

identify, at the telephony endpoint, a particular multi-participant source device from which a particular multi-participant voice stream originated, by analyzing headers of IP packets carrying the plurality of incoming voice streams;

identify the two or more separate voices of the two or more different conference call participants, and associate separate gain factors to each voice in the at least one multi-participant voice stream, the identifying of the two or more separate voices is performed by a voice recognizer at the telephony endpoint and being based on respective voiceprints for the two or more separate voices;

receive, via a user input arrangement at the telephony endpoint, a user input that indicates audio volume adjustment of the telephony endpoint without the user specifying to which one of the two or more different conference call participants of the particular multi-participant voice stream the user input pertains;

automatically identify, at the telephony endpoint, that the user input is received at the same time as a particular voice belonging to a particular conference call participant of the particular multi-participant voice stream;

identify a particular gain factor based on the user input received at the same time as the particular voice belonging to the particular conference call participant of the particular multi-participant voice stream, and associating the particular voice belonging to the particular conference call participant with the particular gain factor;

automatically adjust, at the telephony endpoint and based on the particular gain factor, audio volume of the particular voice independently of audio volume of one or more other voice streams in the plurality of incoming voice streams;

calculate at least one gain factor associated with one or more further incoming voice streams distinct from the particular multi-participant voice stream, the calculating of the at least one gain factor being based, at least partially, on a corresponding user input for each of the one or more further incoming voice streams;

automatically adjusting audio volume of the one or more further incoming voice streams based on the calculated at least one gain factor;

preventing a denial of service attack on the telephony conference call by identifying from the plurality of incoming voice streams a denial of service attack stream whose volume level exceeds a threshold corresponding to a magnitude effective to override the plurality of incoming voice streams, excluding the denial of service attack stream, of the telephony conference call; and in response to identifying the denial of service attack stream, automatically assigning a gain factor of zero for the identified denial of service attack stream.

6. A device to adjust audio volume in a telephony conference call environment at a telephony endpoint, the device comprising:

a memory storing an adjustment module, a calculation module, and a voice identification module;

a receiver module configured to receive a plurality of incoming voice streams from a plurality of associated source devices;

a voice identification module configured to:

identify from the plurality of incoming voice streams at least one multi-participant voice stream, each multi-participant voice stream originating from a multi-participant source device that forms part of the plurality of associated source devices and that is configured for use in the telephony conference call by two or more different conference call participants, the each multi-participant voice stream comprising two or more separate voices of the respective two or more different conference call participants, the device being configured to identify a particular multi-participant source device from which a particular multi-participant voice stream originated, by analyzing headers of IP packets carrying the plurality of incoming voice streams, and identify the two or more separate voices of the two or more different conference call participants, and associating separate gain factors to each voice in the at least one multi-participant voice stream, the identifying of the two or more separate voices being performed by a voice recognizer at the device and being based on respective voiceprints for the two or more separate voices; and a user input arrangement configured to receive a user input that indicates audio volume adjustment of the device without the user specifying to which one of the two or more different conference call participants of the particular multi-participant voice stream the user input pertains, the memory further being configured to store a plurality of gain factors, each of the plurality of gain factors being associated with at least one of the plurality of incoming voice streams, the adjustment module being configured to:
automatically identify that the user input is received at the same time as a particular voice belonging to a particular conference call participant of the particular multi-participant voice stream,
identify a particular gain factor based on the user input received at the same time as the particular voice belonging to the particular conference call participant of the particular multi-participant voice stream,
associate the particular voice belonging to the particular conference call participant with the particular gain factor, and
automatically adjust, at the device and based on the particular gain factor, audio volume of the particular voice based on the particular gain factor independently of audio volume of one or more other voice streams in the plurality of incoming voice streams, the calculation module being configured to calculate at least one gain factor associated with one or more further incoming voice streams distinct from the particular multi-participant voice stream, the calculating of the at least one gain factor being based, at least partially, on a corresponding user input for each of the one or more further incoming voice streams, and the adjustment module further being configured to:
automatically adjust audio volume of the one or more further incoming voice streams based on the calculated at least one gain factor;
prevent a denial of service attack on the telephony conference call by identifying from the plurality of incoming voice streams a denial of service attack stream whose volume level exceeds a threshold corresponding to a magnitude effective to override the plurality of incoming voice streams, excluding the denial of service attack stream, of the telephony conference call; and
in response to identifying the denial of service attack stream, automatically assign a gain factor of zero for the identified denial of service attack stream.

7. The device as claimed in claim 6, in which the adjustment module is configured to automatically adjust audio volume of each of the plurality of incoming voice streams based on a respectively corresponding gain factor, the audio volume of each of the plurality of incoming voice streams being adjusted independently of audio volume of any other one of the plurality of incoming voice streams.

8. The device as claimed in claim 6, wherein the device forms at least part of the telephony endpoint.

9. The device as claimed in claim 8, wherein the telephony endpoint is a VoIP telephony endpoint.

10. The device as claimed in claim 6, which further comprises a sender module to transmit one or more gain factors to a conference bridge, each of the one or more gain factors being associated with both a corresponding one of the plurality of source devices and with the device.

11. A VoIP telephony endpoint comprising:
memory to store a plurality of gain factors associated with a plurality of source devices from which a plurality of incoming voice streams are received; and
a processor configured to:
identify from the plurality of incoming voice streams at least one multi-participant voice stream, each multi-participant voice stream originating from a multi-participant source device that forms part of the plurality of associated source devices and that is configured for use in a telephony conference call by two or more different conference call participants, the each multi-participant voice stream comprising two or more separate voices of the respective two or more different conference call participants;
identify a particular multi-participant source device from which a particular multi-participant voice stream originated, by analyzing headers of IP packets carrying the plurality of incoming voice streams;
identify the two or more separate voices of the two or more different conference call participants, and associating separate gain factors to each voice in the at least one multi-participant voice stream, the identifying of the two or more separate voices being performed by a voice recognizer at the device and being based on respective voiceprints for the two or more separate voices;
receive, via a user input arrangement at the VoIP telephony endpoint, a user input that indicates audio volume adjustment of the VoIP telephony endpoint without the user specifying to which one of the two or more different conference call participants of the particular multi-participant voice stream the user input pertains;
automatically identify, at the telephony endpoint, that the user input is received at the same time as a particular voice belonging to a particular conference call participant of the particular multi-participant voice stream;
identify a particular gain factor based on the user input received at the same time as the particular voice belonging to the particular conference call participant of the particular multi-participant voice stream, and associating the particular voice belonging to the particular conference call participant with the particular gain factor;
automatically adjust, based on the particular gain factor, audio volume of the particular voice independently of audio volume of one or more other voice streams in the plurality of incoming voice streams;
calculate at least one gain factor associated with one or more further incoming voice streams distinct from the particular multi-participant voice stream, the calculating of the at least one gain factor being based, at least partially, on a corresponding user input for each of the one or more further incoming voice streams;
automatically adjusting audio volume of the one or more further incoming voice streams based on the calculated at least one gain factor;
preventing a denial of service attack on the telephony conference call by identifying from the plurality of incoming voice streams a denial of service attack stream whose volume level exceeds a threshold corresponding to a magnitude effective to override the plurality of incoming voice streams, excluding the denial of service attack stream, of the telephony conference call; and in response to identifying the denial of service attack stream, automatically assigning a gain factor of zero for the identified denial of service attack stream.

* * * * *